(12) United States Patent
Yang et al.

(10) Patent No.: US 11,089,480 B2
(45) Date of Patent: Aug. 10, 2021

(54) PROVISIONING ELECTRONIC SUBSCRIBER IDENTITY MODULES TO MOBILE WIRELESS DEVICES

(71) Applicant: Apple Inc., Cupertino, CA (US)

(72) Inventors: Xiangying Yang, Cupertino, CA (US); Anish Kumar Goyal, Milpitas, CA (US); Chandiramohan Vasudevan, Sunnyvale, CA (US); Vikram Bhaskara Yerrabommanahalli, Saratoga, CA (US); Raj S. Chaugule, Santa Clara, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/691,312

(22) Filed: Nov. 21, 2019

(65) Prior Publication Data

US 2020/0178070 A1    Jun. 4, 2020

Related U.S. Application Data

(60) Provisional application No. 62/773,849, filed on Nov. 30, 2018.

(51) Int. Cl.
*H04W 12/48* (2021.01)
*H04W 8/24* (2009.01)

(52) U.S. Cl.
CPC .......... *H04W 12/48* (2021.01); *H04W 8/245* (2013.01)

(58) Field of Classification Search
CPC ........... H04W 4/50; H04W 8/20; H04W 4/60; H04W 8/205; H04W 8/245; H04W 8/265; H04W 8/18; H04W 12/00409; H04L 61/6054; H04B 1/3816
See application file for complete search history.

(56) References Cited

U.S. PATENT DOCUMENTS

| | | | | |
|---|---|---|---|---|
| 2006/0236106 | A1* | 10/2006 | Patel | ........................ H04L 63/08 713/169 |
| 2009/0316603 | A1* | 12/2009 | Amerga | ................. H04W 48/08 370/254 |
| 2013/0219180 | A1* | 8/2013 | Saino | ..................... H04L 9/3271 713/171 |
| 2017/0041733 | A1* | 2/2017 | Babbage | ................ G06F 21/313 |
| 2017/0316106 | A1* | 11/2017 | Pillay-Esnault | ............................. H04W 12/00518 |
| 2019/0208405 | A1* | 7/2019 | Park | ....................... H04W 88/18 |
| 2020/0228969 | A1* | 7/2020 | Shin | ....................... H04W 48/18 |

* cited by examiner

*Primary Examiner* — Quoc Thai N Vu
(74) *Attorney, Agent, or Firm* — Dickinson Wright RLLP

(57) ABSTRACT

This application sets forth techniques for provisioning electronic subscriber identity modules (eSIMs) to mobile wireless devices that do not include functional bootstrap provisioning profiles to obtain access to a cellular wireless network. Connectivity to a cellular wireless network can be allowed for provisioning one or more eSIMs to a mobile wireless device using hardware device identifiers for authentication and a limited purpose provisioning connection when the cellular wireless network supports provisioning connections without the use of a provisioning profile for access.

20 Claims, 8 Drawing Sheets

PROVISIONING ELECTRONIC SUBSCRIBER IDENTITY MODULES TO MOBILE WIRELESS DEVICES

CROSS-REFERENCE TO RELATED APPLICATIONS

This Application claims the benefit of U.S. Provisional Application No. 62/773,849, entitled "PROVISIONING ELECTRONIC SUB SCRIBER IDENTITY MODULES TO MOBILE WIRELESS DEVICES," filed Nov. 30, 2018, the content of which is incorporated by reference herein in its entirety for all purposes.

FIELD

The described embodiments set forth techniques for provisioning electronic subscriber identity modules (eSIMs) to mobile wireless devices that do not include functional bootstrap provisioning profiles to obtain access to a cellular wireless network.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices. Embedded UICCs (eUICCs) can provide advantages over traditional, removable UICCs, as the eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

Some mobile wireless devices at initial acquisition by an end user, such as those devices referred to as being SIM-free, may include a bootstrap eSIM (profile) loaded on an eUICC to provide connectivity to an MNO provisioning server for downloading an operational eSIM to allow the mobile wireless device to access services of the MNO. The bootstrap eSIMs can be preloaded on the eUICC of the mobile wireless device without involvement of a specific end user, typically provided by agreement between the mobile wireless device vendor and the MNO. Features of the bootstrap eSIM can be determined by the MNO and can vary for different MNOs to which an end user can seek to customize an acquired mobile wireless device. The bootstrap eSIM can be used for initial downloading of an operational eSIM for an MNO as well, in some cases, for updates of the eSIM or accompanying software used by the MNO on the mobile wireless device. Access to an MNO provisioning server can also depend on a roaming agreement between the MNO and a local cellular wireless network provider when the mobile wireless device is located in a region in which direct access to the MNO's cellular wireless network is not available.

While a provisioning profile can provide access to acquire a fully functional profile, the inclusion and use of such provisioning profiles poses some issues. Limited storage space in an eUICC of the mobile wireless device can be occupied by one or more provisioning profiles for different MNOs. The provisioning profile may have limited or no functionality when the mobile wireless device is roaming. Additionally, limitations on the number of profiles that can be active simultaneously in a mobile wireless device, e.g., only one active profile at a time on an eUICC in some instances, can result in connectivity for an active profile being severed in order to activate a provisioning profile for downloading or updating an eSIM.

SUMMARY

This Application sets forth techniques for provisioning electronic subscriber identity modules (eSIMs) to mobile wireless devices that do not include functional bootstrap provisioning profiles to obtain access to a cellular wireless network. Connectivity to a cellular wireless network can be allowed for provisioning one or more eSIMs to a mobile wireless device using hardware device identifiers for authentication and a limited purpose provisioning connection when the cellular wireless network supports provisioning connections without the use of a provisioning profile for access. Hardware device identifiers that can be used for authentication and establishing a provisioning connection include an eUICC identifier (EID) and an international mobile equipment identifier (IMEI). Additional credentials, such as a verifiable certificate for the eUICC from a recognized certificate authority (CA) can also be used in conjunction with the one or more hardware device identifiers to authenticate the mobile wireless device. In some embodiments, the mobile wireless device identifies a cellular wireless network that supports bootstrap provisioning connections based on indications broadcast by the cellular wireless network, such as in a system information broadcast (SIB) message. The mobile wireless device requests to establish a radio connection with an access network portion of the cellular wireless network by sending a request that includes a bootstrap connection indication in the request and one or more hardware identifiers. When the request is accepted by the cellular wireless network, the mobile wireless device establishes a secure data connection with an account server of a mobile network operator (MNO) to establish an account and/or to login to an existing account. In some embodiments, the mobile wireless device uses one more hardware device identifiers to authenticate with the account server of the MNO. After authentication, the mobile wireless device connects to a provisioning server for which a uniform resource locator (URL) address has been provided by the account server to the mobile wireless device and downloads and installs one or more eSIMs and/or updates for eSIMs on the eUICC of the mobile wireless device. In some embodiments, the mobile wireless device activates at least one downloaded eSIM or updated eSIM to access services of the MNO.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
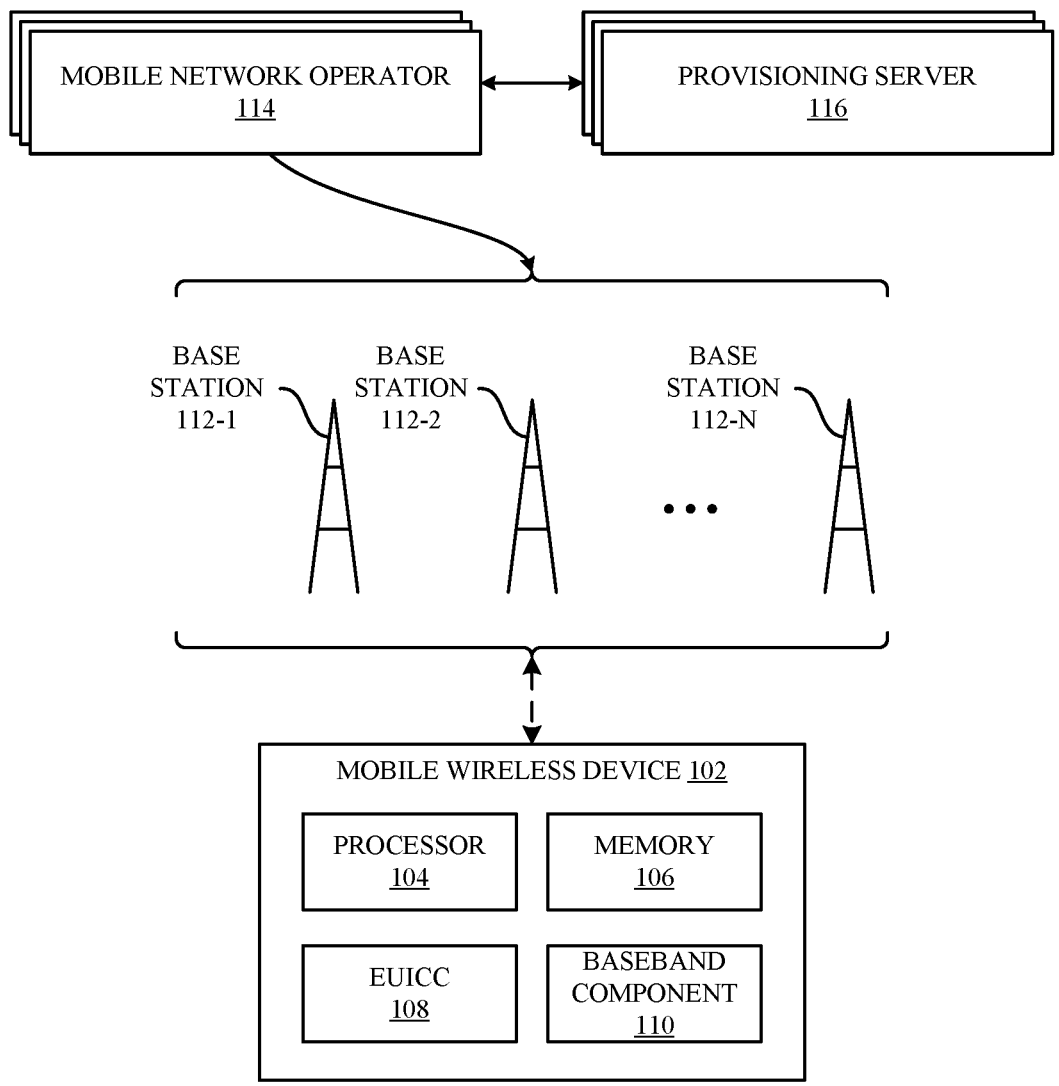
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application sets forth techniques for provisioning electronic subscriber identity modules (eSIMs) to mobile wireless devices that do not include functional bootstrap provisioning profiles to obtain access to a cellular wireless network. In some embodiments, a mobile wireless device obtained by a user does not include a bootstrap provisioning profile for network access to download a functional regular eSIM, while in other embodiments, the mobile wireless device includes such a bootstrap provisioning profile but its capability is not functional within a region in which the mobile wireless device is operating. Limited connectivity for special purposes, such as for emergency calls without a functional SIM/eSIM, are possible for cellular wireless networks, where the mobile wireless device provides one or identifiers to the cellular wireless network to use for authentication. Similarly, the mobile wireless device can request a special provisioning connection and include one or more hardware device identifiers to the cellular wireless network for authentication. In some embodiments, the mobile wireless device requests the special provisioning connection using a random number in place of the one or more hardware identifiers. In some embodiments, the one or hardware identifiers are encrypted prior to sending to the cellular wireless network. Connectivity to the cellular wireless network can be allowed for provisioning one or more eSIMs to the mobile wireless device via a limited purpose provisioning connection when the cellular wireless network supports provisioning connections without requiring the use of a provisioning profile for access. Hardware device identifiers that can be used for authentication and establishing a provisioning connection include an eUICC identifier (EID) and an international mobile equipment identifier (IMEI). The mobile wireless device, in some embodiments, can also perform a partial (one-way) or complete (two-way) authentication protocol, such as based on an authentication key agreement (AKA) with the cellular wireless network. For example, additional credentials, such as a verifiable certificate for the eUICC of the mobile wireless device, where the certificate originates from a recognized certificate authority (CA), can also be used in conjunction with the one or more hardware device identifiers to authenticate the mobile wireless device with the cellular wireless network. Similarly, the mobile wireless device can authenticate the cellular wireless network based on a verifiable certificate provided by the cellular wireless network. In some embodiments, the mobile wireless device identifies cellular wireless networks that support bootstrap provisioning connections based on indications broadcast by the cellular wireless networks, such as in one or more system information broadcast (SIB) messages. In some embodiments, the mobile wireless device includes information, pre-populated before acquisition by the user, of cellular wireless networks that support provisioning connections and/or URL addresses for account servers of MNOs that support provisioning without using a provisioning profile.

The mobile wireless device requests to establish a radio connection with an access network portion of the cellular wireless network by sending a request that includes a bootstrap connection indication in the request and one or more hardware identifiers. When the request is accepted by the cellular wireless network, the mobile wireless device establishes a secure data connection with an account server of a mobile network operator (MNO) to establish an account and/or to login to an existing account. In some embodiments, the mobile wireless device uses one more hardware device identifiers to authenticate with the account server of the MNO. In some embodiments, the mobile wireless device uses random numbers to identify itself when communicating with the access network portion of the cellular wireless network. In some embodiments, the mobile wireless device provides the hardware device identifiers only over a secure connection, such as one established with the account server, and uses random numbers and/or encrypted identifiers when communicating over an unsecure connection. After authentication, the mobile wireless device connects to a provisioning server for which a uniform resource locator (URL) address has been provided by the account server to the mobile wireless device and downloads and installs one or more eSIMs and/or updates for eSIMs on the eUICC of the mobile wireless device. In some embodiments, the mobile wireless device activates at least one downloaded eSIM or updated eSIM to access services of the MNO. In some embodiments, the cellular wireless network limits use of the provisioning connection to access only particular network servers and/or to access only particular URL addresses. In some embodiments, the cellular wireless network limits use of the provisioning connection to downloading of an eSIM or an updated to an eSIM. In some embodiments, the cellular wireless network limits an amount of data that can be downloaded via the provisioning connection, such as to no more than a particular number of bytes of data.

These and other embodiments are discussed below with reference to FIGS. 1-7; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-n that are managed by different Mobile Network Operators (MNOs) 114, and a set of provisioning servers 116 that are in communication with the MNOs 114. The mobile wireless device 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific services (e.g., voice and data) to which the mobile wireless device 102 can be subscribed.

As shown in FIG. 1, the mobile wireless device 102 can include processing circuitry, which can include a processor 104 and a memory 106, an embedded Universal Integrated Circuit Card (eUICC) 108, and a baseband component 110. In some embodiments, the mobile wireless device 102 includes one or more physical UICCs, also referred to as Subscriber Identity Module (SIM) cards (not shown), in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing different MNOs 114 through the base stations 112-1 to 112-n. For example, the eUICC 108 can be configured to store and manage one or more eSIMs for one or more MNOs 114 for different subscriptions to which the mobile wireless device 102 is associated. To be able to access services provided by the MNOs, an eSIM can be provisioned to the eUICC 108. In some embodiments, the eUICC 108 obtains one or more eSIMs (or updates for one or more eSIMs) from one or more associated provisioning servers 116. It is noted that provisioning servers 116 can be maintained by a manufacturer of the mobile wireless device 102, the MNOs 114, third party entities, and the like. Communication of eSIM data between a provisioning server 116 and the eUICC 108 (or between the provisioning server 116 and processing circuitry of the mobile wireless device 102 external to the eUICC 108, e.g., the processor 104) can use a secure communication channel.

The mobile wireless device 102, upon acquisition by a user, can lack an activated eSIM and require the user to select an MNO 114 and download a functional eSIM for the MNO 114 from a corresponding provisioning server 116. In some instances, the mobile wireless device 102 may not include a provisioning eSIM to connect to a base station 112 to reach the provisioning server 116. In some instances, the mobile wireless device 102 includes a provisioning eSIM; however, the provisioning eSIM can be non-functional or otherwise unable to be used to connect to the base station 112 to reach the provisioning server 116. As described further herein, when the cellular wireless network of the MNO 114 supports establishing a provisioning connection with reduced authentication requirements, the mobile wireless device 102 can connected to the base station 112 to reach the provisioning server 116 without using a provisioning eSIM. The provisioning connection can provide limited access capability, such as to specific provisioning servers and can offer restricted capabilities, such as capping a total amount of data that can be downloaded via the provisioning connection. The provisioning connection, once established, can allow the user to select an MNO 114 and download an eSIM for the selected MNO 114 to the eUICC 108. Upon activation of the eSIM, the mobile wireless device 102 can connect to the cellular wireless network of the MNO 114 to access services provided therefrom.

Figure 2:
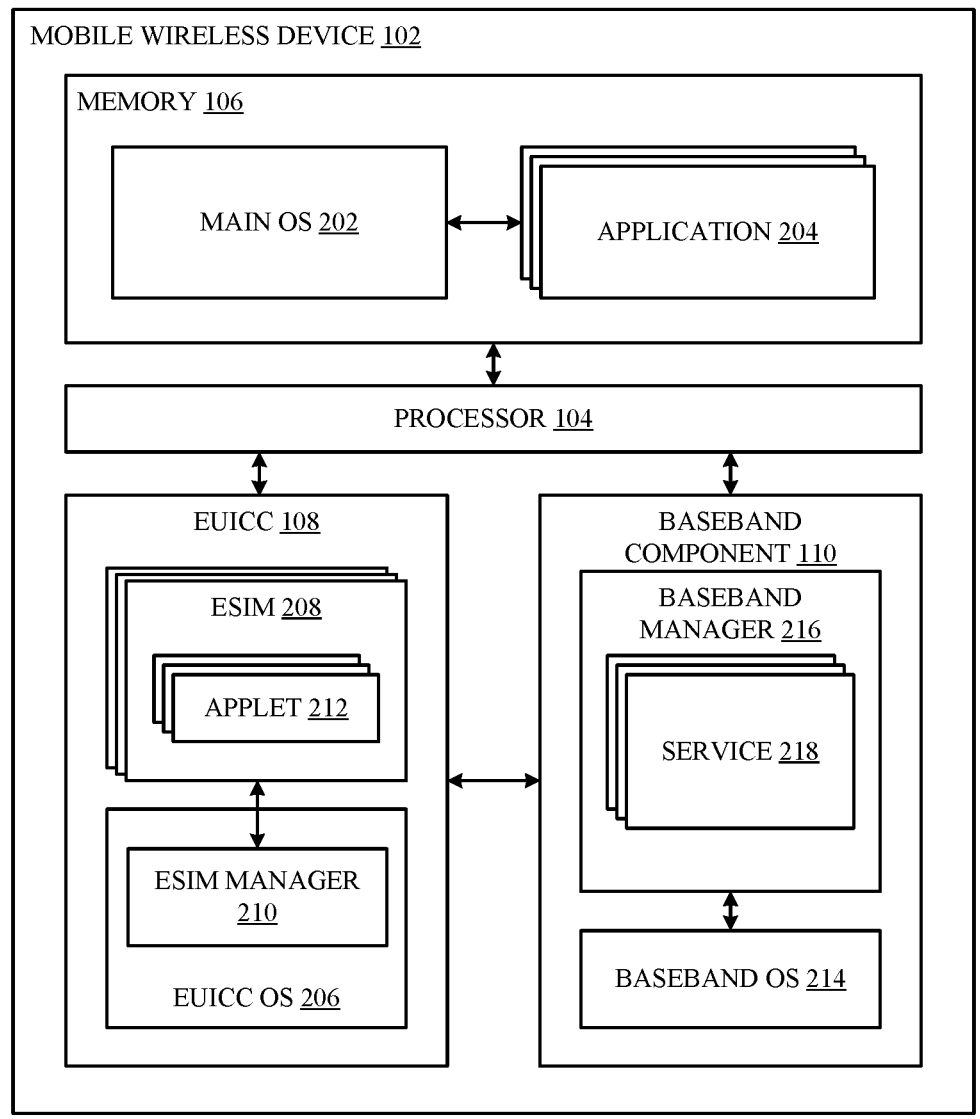
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, or otherwise performing management of the eSIMs 208 within the eUICC 108 and providing the baseband component 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the mobile wireless device 102 to communicate with an MNO 114 and provide useful features (e.g., phone calls and internet) to a user of the mobile wireless device 102.

As also shown in FIG. 2, the baseband component 110 of the mobile wireless device 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
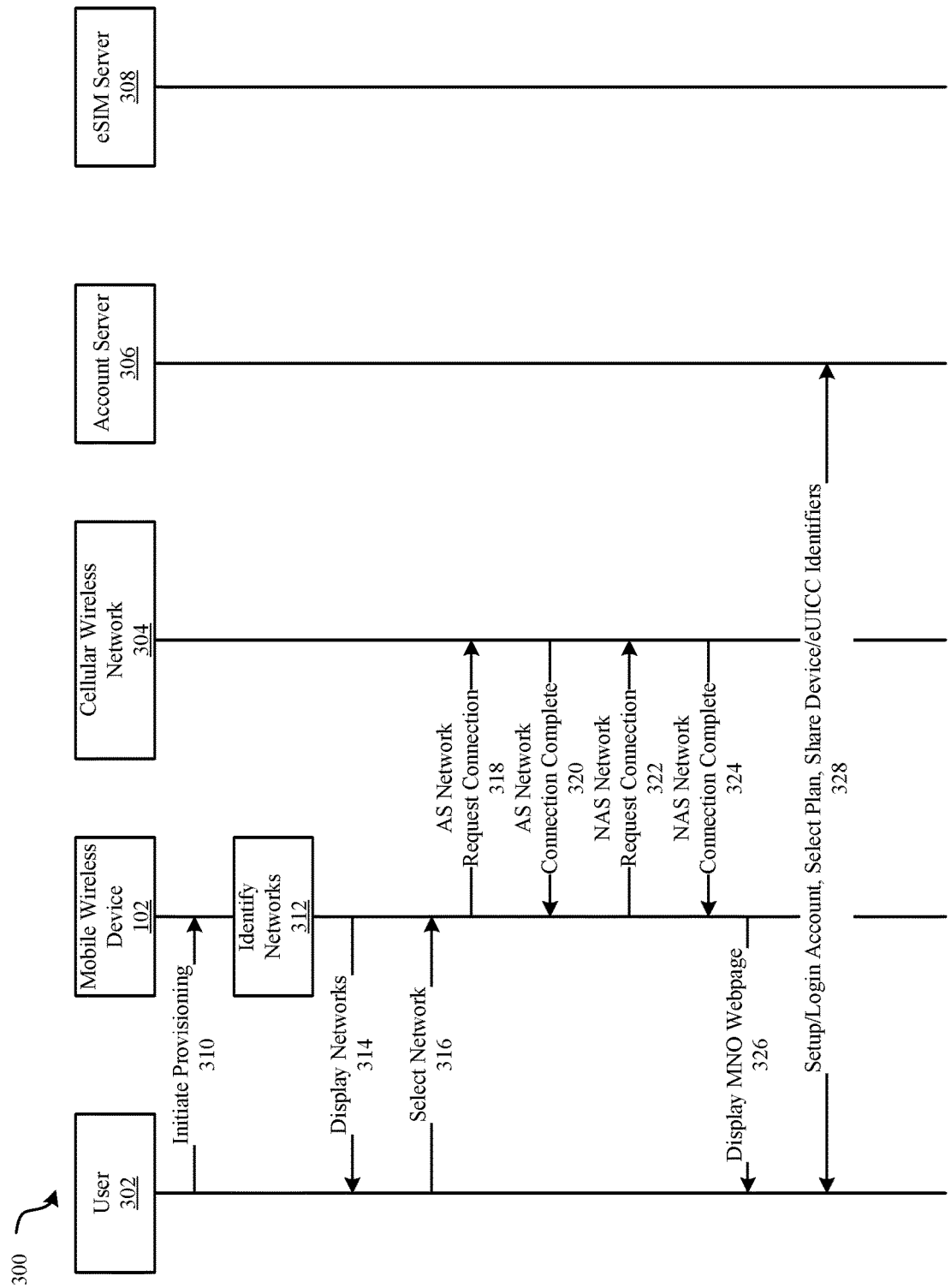
FIGS. 3A and 3B illustrate an exemplary sequence of actions performed to provision an electronic subscriber identity module (eSIM) to a mobile wireless device, according to some embodiments.
Figure 3B:
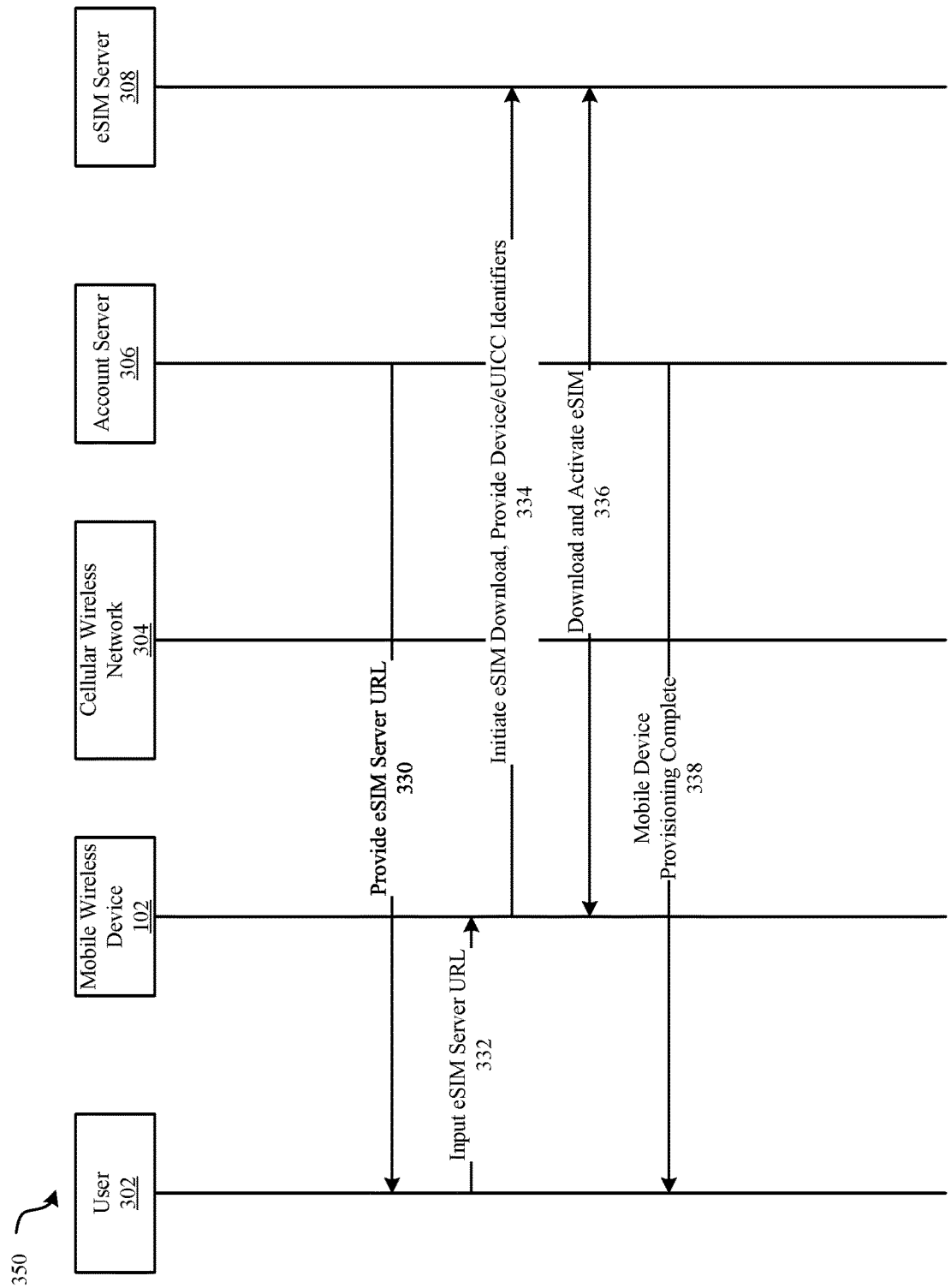

FIGS. 3A and 3B illustrate diagrams 300, 350 of an exemplary sequence of actions performed by various entities, including a mobile wireless device 102, to provision an electronic subscriber identity module (eSIM) 208 to the mobile wireless device 102. At 310, a user 302 of the mobile wireless device 102 can initiate provisioning of the eSIM 208 to the mobile wireless device 102, such as by interacting via an input/output interface of the mobile wireless device 102. At 312, the mobile wireless device 102 can identify cellular wireless networks that support a bootstrap connection mode of operation. In some embodiments, the mobile wireless device 102 performs a search for cellular wireless networks, such as using a full band scan to search for and locate cellular wireless networks based on messages by the cellular wireless network. The search can occur before the user initiates provisioning and/or in response to the user initiating provisioning. In some embodiments, the mobile wireless device 102 determines whether a cellular wireless network supports the bootstrap connection mode based on information broadcast by a network entity, such as a base station 112, of the cellular wireless network. In some embodiments, the cellular wireless network includes an indicator in a system information broadcast (SIB) message indicating support for the bootstrap connection mode, such as in a SIB1 message. Multiple cellular wireless networks visible to the mobile wireless device 102 may support the bootstrap connection mode. The mobile wireless device 102 can receive and process broadcast messages from the multiple cellular wireless networks and identify a set of cellular wireless networks available for connection to the mobile wireless device 102. In some embodiments, the mobile wireless device 102 includes a pre-loaded list of cellular wireless networks that support bootstrap connection modes. In some embodiments, the mobile wireless device 102 includes an initial pre-loaded list of cellular wireless networks (and/or mobile network operators) that support the bootstrap connection mode, where the pre-loaded list is organized by country or region. The mobile wireless device 102 can scan for and locate a cellular wireless network, decode system information in one or more broadcast messages received from the cellular wireless network, and determine a country code for the located cellular wireless network. The mobile wireless device 102 can use the determined country code to determine a set of cellular wireless networks (and/or MNOs) applicable for the determined country code to present to the user of the mobile wireless device via the input/output interface of the mobile wireless device 102. In some embodiments, cellular wireless networks can include a list of available service plans, their associated costs, and/or other details in broadcast system information messages. At 314, the mobile wireless device 102 presents, via the input/output interface of the mobile wireless device 102, an indication (e.g., a list or an array) of available cellular wireless networks that support bootstrap connection modes. In some embodiments, the indication includes information regarding available service plans, costs, and/or details of the service plans to assist the user to select among multiple MNOs that offer access to cellular wireless network services. At 316, the user of the mobile wireless device 102 selects one or more cellular wireless networks, e.g., via the input/output interface, to which a bootstrap connection can be attempted. At 318, the mobile wireless device 102 sends a request to the cellular wireless network 304 to establish an access stratum (AS) radio connection to the access network portion of the cellular wireless network 304. The request includes an indication that the mobile wireless device 102 seeks to establish the radio connection in a bootstrap connection mode, i.e., to establish a bootstrap connection through which provisioning of the mobile wireless device 102 can occur without using a provisioning eSIM. In some embodiments, the request sent to the cellular wireless network 304 include a random number to identify the mobile wireless device 102 while maintaining a level of user privacy. In some embodiments, the request sent to the cellular wireless network 304 is a radio resource control (RRC) connection request. At 320, the access network portion of the cellular wireless network 304 provides an indication to the mobile wireless device 102 that the AS radio connection establishment is complete. At 322, the mobile wireless device 102 sends a second request to the cellular wireless network 304 to establish a non-access stratum (NAS) secure data connection, where the second request includes an indication that the NAS secure data connection is for a bootstrap connection mode. In some embodiments, the second request includes a random number to identify the mobile wireless device 102 to protect user privacy. In some embodiments, the second request is a NAS attach request message and/or a NAS activate default bearer context message. At 324, the cellular wireless network 304 sends to the mobile wireless device 102 a response that indicates that the NAS secure data connection is established and provides information for the secure data connection, such as an internet protocol (IP) address allocated to the mobile wireless device 102 for the secure data connection. In some embodiments, the response is a NAS attach accept message. In addition, the cellular wireless network 304 provides a uniform resource locator (URL) address for the mobile wireless device 102 to connect with in order to continue with a provisioning session. In some embodiments, the URL address provided to the mobile wireless device 102 allows for connecting the mobile wireless device 102 to an account server 306 of an MNO. At 326, the mobile wireless device 102 presents, to a user of the mobile wireless device 102 via an input/output interface, a webpage for MNO to access the account server 306 of the MNO. In some embodiments, the secure data connection between the mobile wireless device 102 and the account server includes transport layer security (TLS). At 328, the user 302 of the mobile wireless device 102 interacts with the account server to login to an existing account or to establish a new account with the MNO. The account server 306 can provide information regarding cellular wireless service plans from which the user 302 of the mobile wireless device 102 can select a plan. Additionally, the mobile wireless device 102 can share hardware device identifiers of the mobile wireless device 102 with the account server 306 to use for identification and/or authentication and authorization for access to subscription of cellular wireless services of the MNO. In some embodiments, the hardware device identifiers include an eUICC identifier (EID) and/or an international mobile equipment identifier (IMEI). In some embodiments, the mobile wireless device 102 provides a certificate associated with the eUICC 108 of the mobile wireless device 102 to the account server 306 as a form of passive authentication, where the certificate is issued by a certificate authority recognized by the MNO to be valid for authentication. At 330, the account server 306 provides to the user 302 and mobile wireless device 102 via the secure data connection a URL for an eSIM server 308 to which a secure IP data connection can be established. At 332, the user 302 of the mobile wireless device 102 enters the URL of the eSIM server 308 via the input/output interface of the mobile wireless device 102 to cause the mobile wireless device 102 to establish a secure IP data connection to the eSIM server 308. At 334, the mobile wireless device 102 provides one or more hardware device identifiers, such as an EID and/or an IMEI, to the eSIM server 308 and initiates download of an eSIM 208 from the eSIM server 308. At 336, the eSIM server 308 downloads the eSIM 208 to the mobile wireless device 102, which activates the eSIM 208. At 338, the account server 306, provides an indication that provisioning of the eSIM 208 to the mobile wireless device 102 is complete. In some embodiments, the mobile wireless device 102, after provisioning of the eSIM 208 is complete, can periodically attempt to connect to the cellular wireless network 304 using the installed eSIM 208 to determine if the eSIM 208 and/or the associated account with the eSIM 208 has been configured by the MNO 114. Upon successful connection to the cellular wireless network using the installed eSIM 208, the user can be notified of account activation and/or eSIM activation. In some embodiments, when a successful connection cannot be established using the eSIM 208 within an activation threshold time period, the user of the mobile wireless device 102 can be notified of the lack of account activation and/or eSIM activation.

Figure 4:
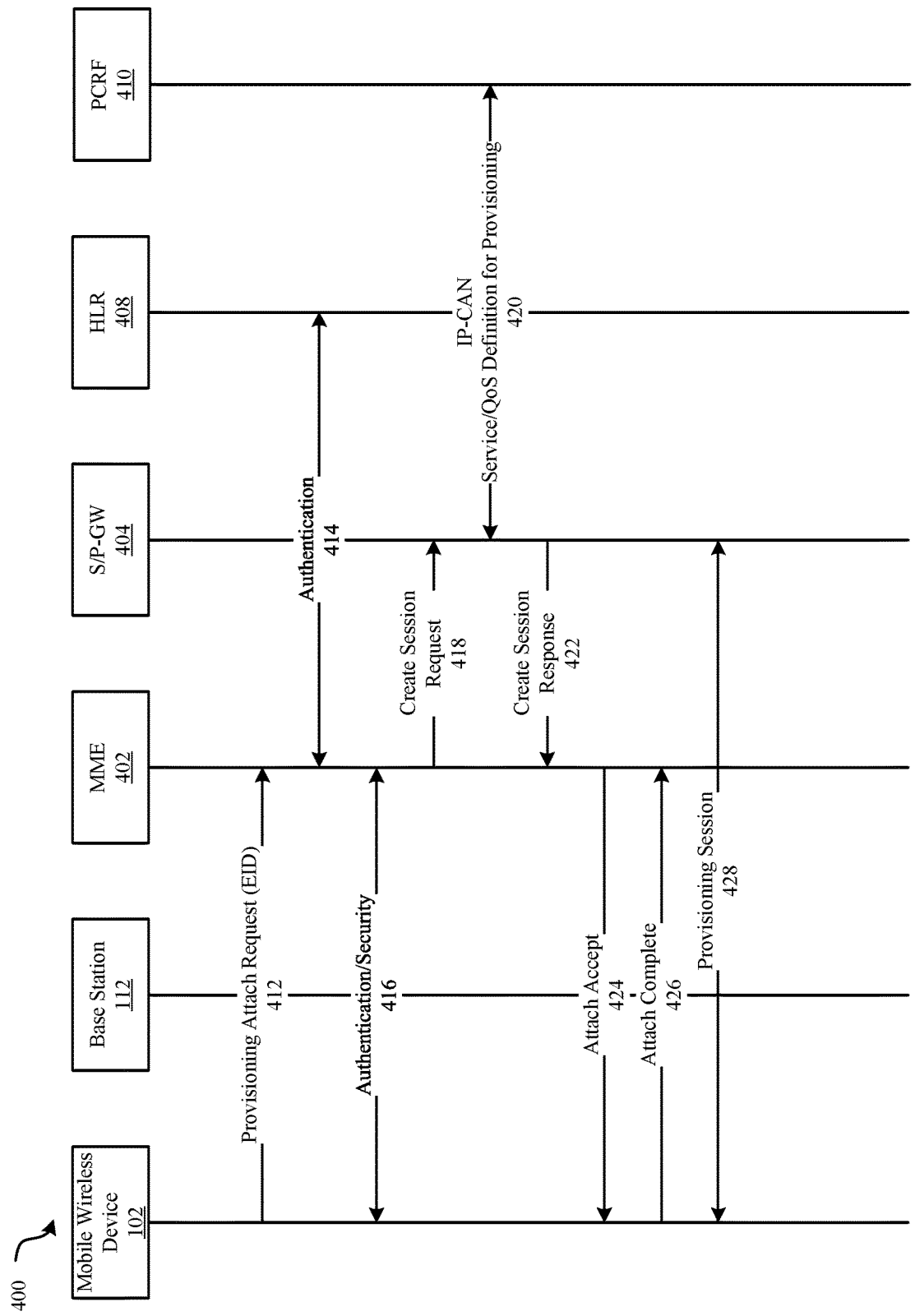
FIG. 4 illustrates another exemplary sequence of actions performed to provision an eSIM to a mobile wireless device, according to some embodiments.

FIG. 4 illustrates a diagram 400 of another exemplary sequence of actions that can be performed to provision an eSIM 208 to a mobile wireless device 102. At 412, the mobile wireless device 102 sends a request to a network entity, e.g., to a mobility management entity (MME) 402, to establish a secure connection for provisioning with a cellular wireless network. In some embodiments, the request includes an indication that the mobile wireless device 102 seeks to establish a provisioning connection and one or more hardware device identifiers, such as an EID and/or an IMEI of the mobile wireless device 102. In some embodiments, the request to establish the connection includes an attach cause that has a value for provisioning. In some embodiments, the one or more hardware device identifiers are sufficient for authentication with the cellular wireless network. In some embodiments, the one or more hardware device identifiers alone are insufficient for authentication with the cellular wireless network, and the cellular wireless network requires a certificate and/or key based authentication, such as a public key infrastructure (PKI) authentication session. At 414, the MME 402 authenticates the mobile wireless device 102 with the home location register (HLR) 408 using the one or more hardware device identifiers. At 416, the mobile wireless device 102 performs an authentication and security session, such as a PKI authentication session, with the MME 402. In some embodiments, the authentication and security session includes the mobile wireless device 102 providing a certificate for the eUICC 108 of the mobile wireless device 102 to the MME 402 and one or more signing keys associated with the eUICC 108 of the mobile wireless device 102. In some embodiments, the authentication and security session is unidirectional, in that the mobile wireless device 102 authenticates itself with the MME 402 using the eUICC certificate and signing keys. In some embodiments, the authentication and security session is bidirectional, in that the mobile wireless device 102 also authenticates the MME 402 based on a certificate and one or more signing keys provided by the MME 402. In some embodiments, the authentication and security session is an extensible authentication protocol transport layer security (EAP-TLS) type mutual authentication session. In some embodiments, the eUICC certificate and/or the certificate from the MME 402 are provided by a common certificate authority (CA), such as by a CA managed by the Global System for Mobile communications Association (GSMA). In some embodiments, the eUICC certificate and the certificate from the MME 402 do not belong to a common CA, and the mobile wireless device 102 is instead pre-provisioned with a network entity (e.g., MME 402) certificate and/or a public key to authenticate with the cellular wireless network. In some embodiments, pre-provisioning of network entity certificates can be provided to the mobile wireless device 102 via a carrier bundle downloaded from a network-based server, such as a server managed by a manufacturer of the mobile wireless device 102, where the carrier bundle includes one or more network entity certificates for one or more cellular wireless networks. In some embodiments, the hardware device identifiers and/or the certificate provided by the mobile wireless device 102 can be encrypted prior to sending to the MME 402 of the cellular wireless network to protect privacy of user of the mobile wireless device 102. In some embodiments, the cellular wireless network accepts one or more certificates for authentication from one or more particular CAs and rejects one or more certificates from other CAs. At 418, the MME 402 submits a create session request to a S/P gateway (GW) 404. At 420, the S/P-GW 404 establishes an internet protocol connectivity access network (CAN) session with a policy and charging rules function (PCRF) 410 of the cellular wireless network and determines services and quality of service (QoS) for provisioning an eSIM 208 to the mobile wireless device 102. At 422, the S/P-GW 404 provides a create session response to the MME 402. At 424, the MME 402 replies to the provisioning attach request from the mobile wireless device 102 with an attach accept message. At 426, the mobile wireless device 102 replies with an attach complete message. At 428, a provisioning session can occur in which the mobile wireless device 102 is provisioned one or more eSIMs 208 by the cellular wireless network via a secure data connection established therewith. In some embodiments, the cellular wireless network through which the mobile wireless device 102 establishes the secure data connection determines policies that apply to the secure data connection of the provisioning session. In some embodiments, connectivity of the mobile wireless device 102 (prior to downloading and activation of an eSIM 208) can be limited to access only certain destinations, such as particular web portal addresses, particular provisioning servers, or the like. In some embodiments, policies applied to the secure data connection of the provisioning session can restrict the mobile wireless device 102 to downloading eSIMs 208 from the MNO of the cellular wireless network. In some embodiments, the cellular wireless network limits destinations that are reachable by the mobile wireless device 102 and/or limits actions that can be taken by the mobile wireless device 102 via the secure data connection of the provisioning session. In some embodiments, a data download rate and/or total data download amount can be limited to a threshold download rate and/or a threshold download amount by the cellular wireless network for the mobile wireless device 102 to use via the secure data connection of the provisioning session. In some embodiments, costs for downloading the eSIM 208 to the mobile wireless device 102 can be allocated among the cellular wireless network and other parties without requiring the user of the mobile wireless device 102 to bear a portion of the costs for downloading the eSIM 208.

In some embodiments, different levels of security can be required for the provisioning session to be established. A first security level can include the mobile wireless device 102 providing one or more hardware device identifiers (non-encrypted and/or encrypted) without additional authentication. A second security level can include the mobile wireless device 102 additionally providing a valid, verifiable certificate associated with the eUICC 108 of the mobile wireless device 102. In third security level can include the mobile wireless device 102 providing response to a challenge from the cellular wireless network, where the response is signed with a certificate associated with the eUICC 108 of the mobile wireless device 102.

In some embodiments, cellular wireless networks broadcast support for using a limited purpose, bootstrap (or provisioning) connection to allow for provisioning and/or updating eSIMs 208 of a mobile wireless device 102. In some embodiments, support for the bootstrap/provisioning connection capability is broadcast in one or more system information messages by the cellular wireless network. In some embodiments, the mobile wireless device 102 indicates a bootstrap/provisioning connection as a reason for establishing a connection with the cellular wireless network. In some embodiments, access stratum (AS), non-access stratum (NAS), internet protocol (IP), and/or packet data network (PDN) connection setup can include options for indicating support for a bootstrap/provisioning connection, such as in attach request messages. In some embodiments, support for a bootstrap/provisioning connection can also be indicated and/or requested when establishing an IP connection to a URL or IP address such as to an account server 306. In some embodiments, support for bootstrap/provisioning connections for an MNO and/or a cellular wireless network can be preloaded in the mobile wireless device 102 such that a list or array of MNOs/cellular wireless networks that support the capability can be presented to a user of the mobile wireless device 102. In some embodiments, URLs for account servers 306 for MNOs/cellular wireless networks that support bootstrap/provisioning connections for eSIM provisioning and/or account establishment can be preloaded in the mobile wireless device 102, such as through a carrier configuration bundle provided by operating system software of the mobile wireless device 102.

Figure 5:
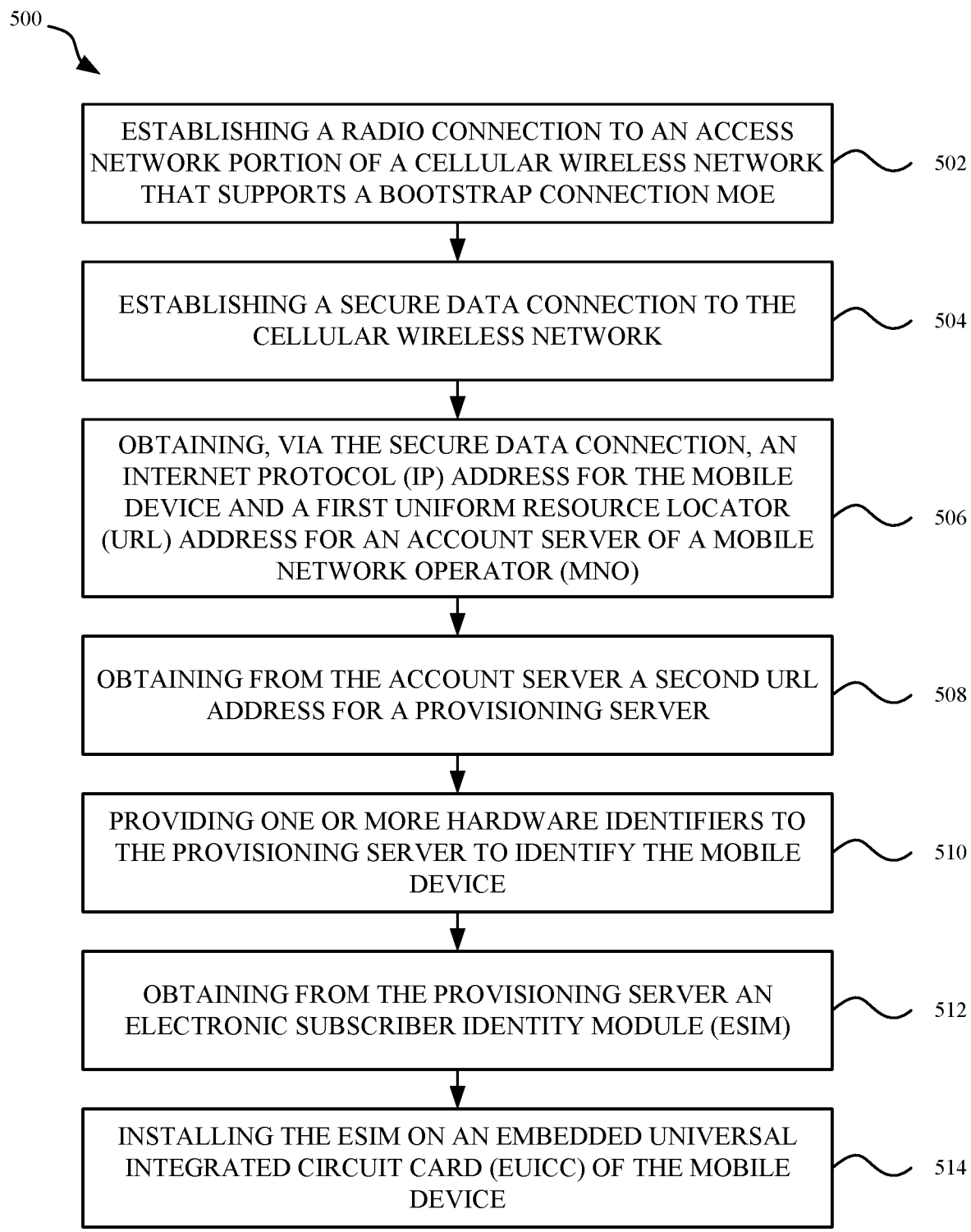
FIG. 5 illustrates a flowchart of an exemplary method to provision an eSIM to a mobile wireless device, according to some embodiments.

FIG. 5 illustrates a flowchart 500 of an exemplary method, performed by a mobile wireless device 102, to provision an eSIM 208 to the mobile wireless device 102. At 502, the mobile wireless device 102 establishes a radio connection to an access network portion of a cellular wireless network that supports a bootstrap connection mode. In some embodiments, the bootstrap connection mode is established without active authentication between the mobile wireless device 102 and the cellular wireless network based on one or more certificates. In some embodiments, the mobile wireless device determines one or more cellular wireless networks that support the bootstrap connection mode based on system information broadcast (SIB) messages broadcast by the one or more cellular wireless networks. In some embodiments, the mobile wireless device 102 presents, via an input/output interface of the mobile wireless device 102, an indication of one or more cellular wireless networks and selects a cellular wireless network from the one or more cellular wireless networks based on input received via the input/output interface of the mobile wireless device 102. In some embodiments, the mobile wireless device 102 establishes the radio connection by at least sending a radio connection request to the access network portion of the cellular wireless network, where the radio connection request includes an indication to establish the radio connection using a bootstrap connection mode. In some embodiments, the radio connection request includes a random number as an identifier for the mobile wireless device 102. At 504, the mobile wireless device 102 establishes a secure data connection to the cellular wireless network. In some embodiments, the mobile wireless device 102 establishes the data connection by at least sending a network attach request to the cellular wireless network, where the network attach request includes an indication to establish the data connection using a bootstrap connection mode. In some embodiments, the network attach request includes a random number as an identifier for the mobile wireless device 102. In some embodiments, the secure data connection is secured using a transport layer security (TLS) protocol. At 506, the mobile wireless device 102 obtains, via the secure data connection, an internet protocol (IP) address for the mobile wireless device 102 and a uniform resource locator (URL) address for an account server 306 of a mobile network operator (MNO) of the cellular wireless network. At 508, the mobile wireless device 102 obtains from the account server 306 a second URL address for a provisioning server, e.g., an eSIM server 308 from which an eSIM 208 can be provisioned to the mobile wireless device 102. At 510, the mobile wireless device 102 provides to the provisioning server one or more hardware device identifiers of the mobile wireless device 102 to identify the mobile wireless device 102 to the provisioning server. In some embodiments, the one or more hardware device identifiers include an eUICC identifier (EID) and/or an international mobile equipment identifier (IMEI) of the mobile wireless device 102. At 512, the mobile wireless device obtains from the provisioning server an eSIM 208. At 514, the mobile wireless device 102 installs the eSIM 208 on an eUICC 108 of the mobile wireless device 102.

Figure 6:
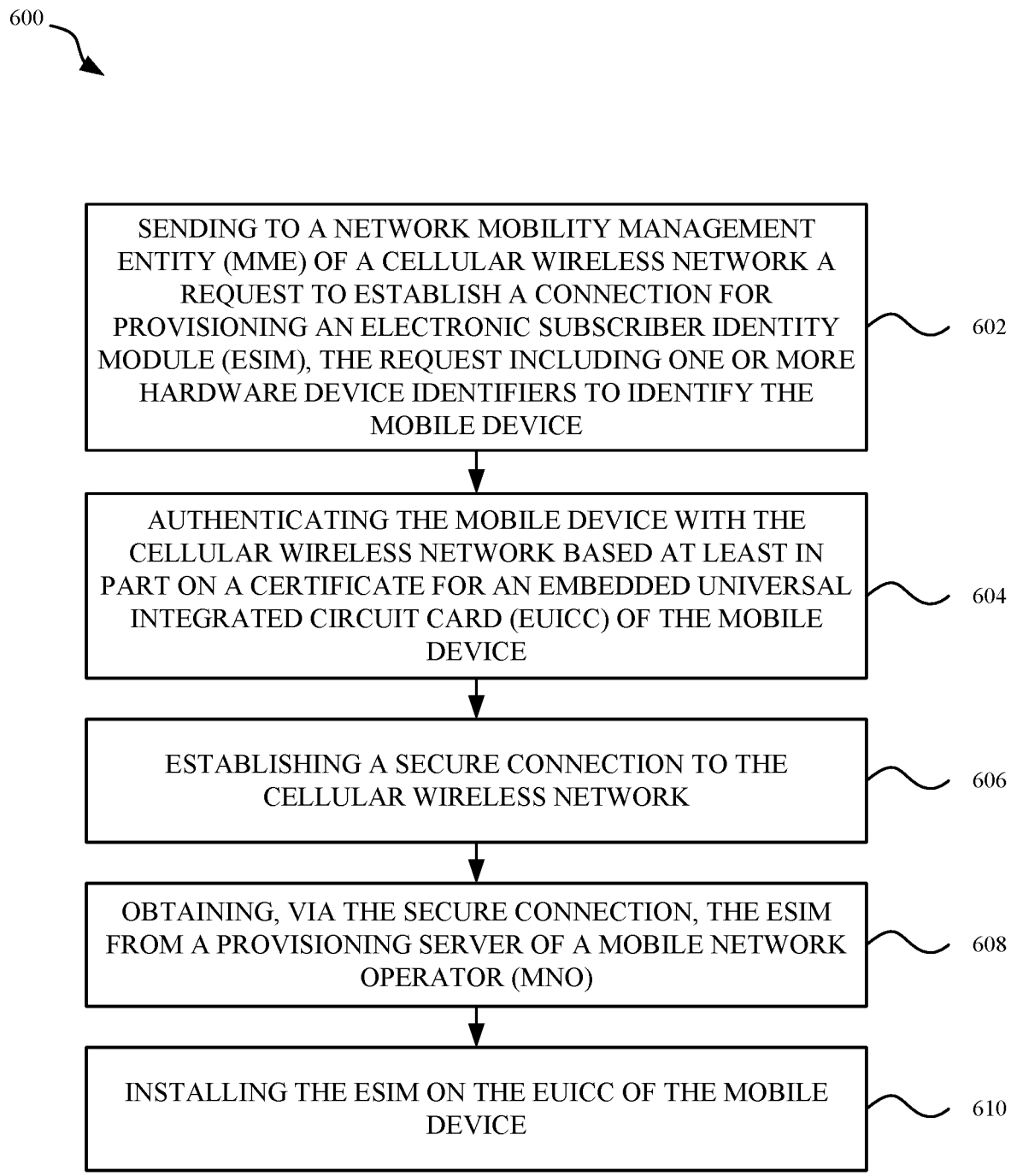
FIG. 6 illustrates a flowchart of another exemplary method to provision an eSIM to a mobile wireless device, according to some embodiments.

FIG. 6 illustrates a flowchart 600 of another exemplary method, performed by a mobile wireless device 102, to provision an eSIM 208 to the mobile wireless device 102. At 602, the mobile wireless device 102 sends to a network mobility management entity (MME) of a cellular wireless network a request to establish a connection provisioning an eSIM 208 to the mobile wireless device 102, where the request includes one or more hardware device identifiers of the mobile wireless device 102 to identify the mobile wireless device 102 to the MME. In some embodiments, the one or more hardware device identifiers include an eUICC identifier (EID) and/or an international mobile equipment identifier (IMEI) of the mobile wireless device 102. In some embodiments, the at least one of the one or more hardware device identifiers is encrypted prior to inclusion in the request to establish the connection for provisioning the eSIM 208 to the mobile wireless device 102. At 604, the mobile wireless device 102 authenticates with the cellular wireless network based at least in part on a certificate for an eUICC 108 of the mobile wireless device 102. In some embodiments, the certificate for the eUICC 108 is encrypted prior to authentication with the cellular wireless network 304. At 606, the mobile wireless device 102 establishes a secure connection to the cellular wireless network. In some embodiments, the secure connection between the mobile wireless device 102 and the cellular wireless network is restricted to access to a provisioning server, e.g., an eSIM server 308, of an MNO of the cellular wireless network. In some embodiments, use of the secure connection by the mobile wireless device 102 is restricted to downloading at most a threshold amount of data. At 608, the mobile wireless device 102 obtains, via the secure connection, an eSIM 208 from the provisioning server of the MNO. At 610, the mobile wireless device 102 installs the eSIM 208 on the eUICC 108 of the mobile wireless device 102. In some embodiments, the method further includes the mobile wireless device 102 authenticating the cellular wireless network based at least in part on a certificate provided by the cellular wireless network to the mobile wireless device 102. In some embodiments, the certificate for the eUICC 108 provided by the mobile wireless device 102 to the cellular wireless network to authenticate the mobile wireless device 102 with the cellular wireless network and the certificate from the cellular wireless network to authenticate the cellular wireless network with the mobile wireless device 102 are each certified by a common certificate authority (CA).

In some embodiments, a mobile wireless device 102 includes (i) wireless circuitry including one or more antennas, and (ii) one or more processors communicatively coupled to the wireless circuitry and to a memory storing instructions that, when executed by the one or more processors, cause the mobile wireless device to obtain and install an eSIM 208 by at least performing a set of actions that include: establishing a radio connection to an access network portion of a cellular wireless network that supports a bootstrap connection mode; establishing a secure data connection to the cellular wireless network; obtaining, via the secure data connection, an internet protocol (IP) address for the mobile wireless device 102 and a first uniform resource locator (URL) address for an account server 306 of an MNO 114; obtaining from the account server 306 a second URL address for a provisioning server 116; providing one or more hardware device identifiers to the provisioning server 116 to identify the mobile wireless device 102; obtaining from the provisioning server 116 the eSIM 208; and installing the eSIM 208 on an eUICC 108 of the mobile wireless device 102.

Figure 7:
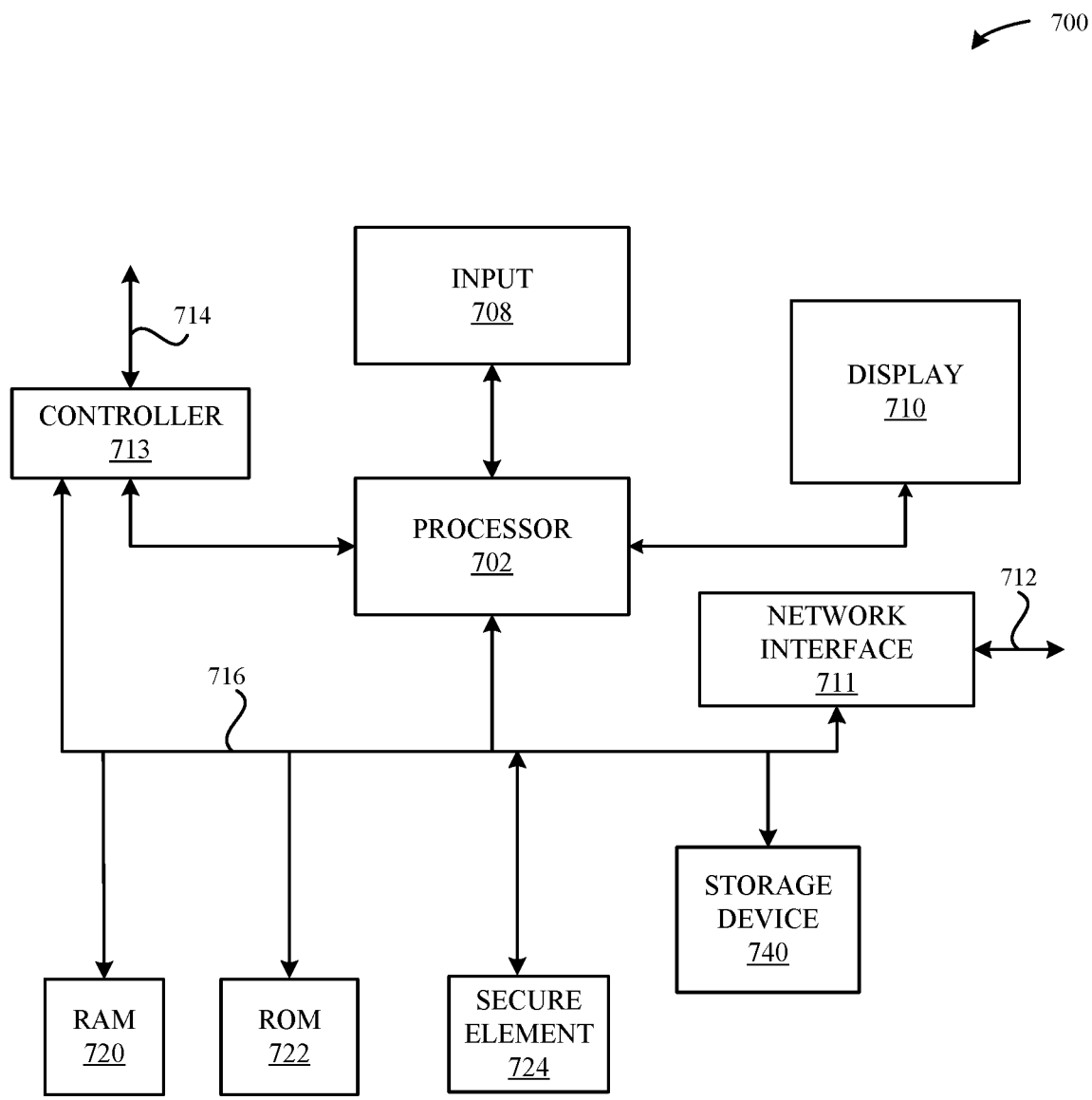
FIG. 7 illustrates a block diagram of exemplary elements of a mobile wireless device, according to some embodiments.

FIG. 7 illustrates a detailed view of a representative computing device 700 that can be used to implement various methods described herein, according to some embodiments. In particular, the detailed view illustrates various components that can be included in the mobile wireless device 102. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that communicatively couples to a data link 712. In the case of a wireless connection, the network/bus interface 711 can include a wireless transceiver.

The computing device 700 also includes a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include a secure element (SE) 1050, which can represent secure storage for cellular wireless system access by the mobile wireless device 102. The computing device 700 further includes a secure element 724, which can include an eUICC 108 on which to store one or more eSIMs 208.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for obtaining and installing an electronic Subscriber Identity Module (eSIM) at a mobile wireless device, the method comprising:
by the mobile wireless device:
determining one or more cellular wireless networks that support a bootstrap connection mode for installation of the eSIM without requiring use of a limited access bootstrap eSIM;
establishing an access stratum (AS) radio connection to an access network portion of a cellular wireless network selected from the one or more cellular wireless networks that support the bootstrap connection mode;
establishing a non-access stratum (NAS) secure data connection to the cellular wireless network;
obtaining, via the NAS secure data connection, an internet protocol (IP) address for the mobile wireless device and a first uniform resource locator (URL) address for an account server of a mobile network operator (MNO);
obtaining from the account server a second URL address for a provisioning server;
providing one or more hardware device identifiers to the provisioning server to identify the mobile wireless device;
obtaining from the provisioning server the eSIM; and
installing the eSIM on an embedded universal integrated circuit card (eUICC) of the mobile wireless device,
wherein:
the mobile wireless device indicates use of the bootstrap connection mode in requests to establish the AS radio connection and the NAS secure data connection; and
the eSIM provides full access to cellular wireless services of the MNO.

2. The method of claim 1, wherein the bootstrap connection mode is established without active authentication between the mobile wireless device and the cellular wireless network based on one or more certificates.

3. The method of claim 1, wherein the determining the one or more cellular wireless networks that support the bootstrap connection mode is based on system information broadcast (SIB) messages broadcast by the one or more cellular wireless networks that include an indication of support for the bootstrap connection mode.

4. The method of claim 3, further comprising:
by the mobile wireless device:
presenting, via an interface of the mobile wireless device, an indication of the one or more cellular wireless networks; and
selecting the cellular wireless network from the one or more cellular wireless networks based on input received via the interface of the mobile wireless device.

5. The method of claim 1, wherein:
establishing the AS radio connection comprises sending a radio connection request to the access network portion of the cellular wireless network, the radio connection request including an indication to establish the radio connection using the bootstrap connection mode.

6. The method of claim 5, wherein the radio connection request includes a random number as an identifier for the mobile wireless device.

7. The method of claim 1, wherein:
establishing the NAS secure data connection comprises sending a network attach request to the cellular wireless network, the network attach request including an indication to establish the NAS secure data connection using the bootstrap connection mode.

8. The method of claim 7, wherein the network attach request includes a random number as an identifier for the mobile wireless device.

9. The method of claim 1, wherein the NAS secure data connection is secured using a transport layer security (TLS) protocol.

10. The method of claim 1, wherein the one or more hardware device identifiers include an eUICC identifier (EID).

11. The method of claim 1, wherein the one or more hardware device identifiers include an international mobile equipment identifier (IMEI).

12. The method of claim 1, wherein the eSIM obtained from the provisioning server allows the mobile wireless device to obtain the cellular wireless services from the MNO subsequent to installation and activation of the eSIM on the eUICC of the mobile wireless device.

13. The method of claim 1, wherein:
the one or more hardware device identifiers include an encrypted eUICC identifier (EID), and
the EID is encrypted before establishing the AS radio connection.

14. The method of claim 1, wherein the NAS secure data connection is restricted to access to the provisioning server for obtaining the eSIM.

15. The method of claim 1, wherein the NAS secure data connection is limited to downloading at most a threshold amount of data.

16. A mobile wireless device comprising:
wireless circuitry comprising one or more antennas; and
one or more processors communicatively coupled to the wireless circuitry and to a memory storing instructions that, when executed by the one or more processors, cause the mobile wireless device to obtain and install an electronic Subscriber Identity Module (eSIM) by at least:
determining one or more cellular wireless networks that support a bootstrap connection mode for installation of the eSIM without requiring use of a limited access bootstrap eSIM;
establishing an access stratum (AS) radio connection to an access network portion of a cellular wireless network selected from the one or more cellular wireless networks that support the bootstrap connection mode;
establishing a non-access stratum (NAS) secure data connection to the cellular wireless network;
obtaining, via the NAS secure data connection, an internet protocol (IP) address for the mobile wireless device and a first uniform resource locator (URL) address for an account server of a mobile network operator (MNO);
obtaining from the account server a second URL address for a provisioning server;
providing one or more hardware device identifiers to the provisioning server to identify the mobile wireless device;
obtaining from the provisioning server the eSIM; and
installing the eSIM on an embedded universal integrated circuit card (eUICC) of the mobile wireless device,
wherein:
the mobile wireless device indicates use of the bootstrap connection mode in requests to establish the AS radio connection and the NAS secure data connection; and
the eSIM provides full access to cellular wireless services of the MNO.

17. The mobile wireless device of claim 16, wherein the bootstrap connection mode is established without active authentication between the mobile wireless device and the cellular wireless network based on one or more certificates.

18. The mobile wireless device of claim 16, wherein the determining the one or more cellular wireless networks that support the bootstrap connection mode is based on system information broadcast (SIB) messages broadcast by the one or more cellular wireless networks that include an indication of support for the bootstrap connection mode.

19. The mobile wireless device of claim 16, wherein:
establishing the AS radio connection comprises sending a radio connection request to the access network portion of the cellular wireless network, the radio connection request including an indication to establish the radio connection using the bootstrap connection mode.

20. The mobile wireless device of claim 19, wherein the radio connection request includes a random number as an identifier for the mobile wireless device.

* * * * *